United States Patent [19]

Christopher et al.

[11] Patent Number: 4,460,958
[45] Date of Patent: Jul. 17, 1984

[54] WINDOW-SCANNED MEMORY

[75] Inventors: Lauren A. Christopher, Weedsport, N.Y.; Glenn A. Reitmeier, Trenton; Terrence R. Smith, Clementon, both of N.J.; Christopher H. Strolle, Philadelphia, Pa.

[73] Assignee: RCA Corporation, New York, N.Y.

[21] Appl. No.: 298,268

[22] Filed: Aug. 31, 1981

[30] Foreign Application Priority Data

Jan. 26, 1981 [GB] United Kingdom ............... 8102281
Mar. 23, 1981 [GB] United Kingdom ............... 8108967

[51] Int. Cl.³ ............................................ G06F 13/06
[52] U.S. Cl. ............................................ 364/200
[58] Field of Search ............... 364/200, 900; 382/31, 382/56; 340/721, 725, 726, 731, 747, 750, 752, 723

[56] References Cited

U.S. PATENT DOCUMENTS

| | | | |
|---|---|---|---|
| 3,737,860 | 6/1973 | Sporer | 340/172.5 |
| 3,800,292 | 3/1974 | Curley et al. | 340/172.5 |
| 3,899,771 | 8/1975 | Saraga et al. | 340/146.3 AE |
| 3,956,737 | 5/1976 | Ball | 340/172.5 |
| 4,070,710 | 1/1978 | Sukonick et al. | 364/200 |
| 4,112,487 | 9/1978 | Nutter et al. | 364/200 |
| 4,127,850 | 11/1978 | Vallins | 340/324 A |
| 4,197,590 | 4/1980 | Sukonick et al. | 364/900 |
| 4,203,154 | 5/1980 | Lampson et al. | 364/200 |
| 4,318,183 | 3/1982 | Byington et al. | 364/900 |
| 4,378,591 | 3/1983 | Lemay | 364/200 |

FOREIGN PATENT DOCUMENTS

| | | |
|---|---|---|
| 1423397 | 2/1976 | United Kingdom . |
| 1504602 | 3/1978 | United Kingdom . |
| 1504713 | 3/1978 | United Kingdom . |
| 1505914 | 5/1978 | United Kingdom . |

Primary Examiner—Joseph F. Ruggiero
Assistant Examiner—Jameson Lee
Attorney, Agent, or Firm—Joseph S. Tripoli; George E. Haas; Allen LeRoy Limberg

[57] ABSTRACT

The storage locations of a memory system map a field of sample points. Apparatus affording parallel access to a plurality of storage locations describing an array of the sample points in an access window, which window can be shifted to any selected region of field of sample points responsive to orthogonal address coordinates of one of the sample points in the array, is described.

10 Claims, 8 Drawing Figures

WINDOW-SCANNED MEMORY invention concerns memory systems operating like a row-and-column-addressed memory in which the field of sample points defined by the data stored at the address locations is not accessed serially, sample point by sample point, but rather parallelly, several spatially adjacent sample points at a time.

The contiguous sample points are arrayed in a "window", which will scan through the field responsive to an address scan. Such memory systems are useful in digital filtering and in linear or higher-order interpolation applications, particularly those concerned with raster-scanned fields of data such as television signals.

The invention is embodied in a memory system in which the memory is divided into submemories with separate data busses. The data busses of these submemories are accessed through a multiplexor controlled by less significant bits of row addresses or column addresses, or both, supplied to the memory system from an address generator. More significant bits of the row and column addresses supplied to the memory system are applied as row and column addresses to the individual submemories, either directly or indirectly after modification responsive to less significant bits of the corresponding address.

Figure 1:
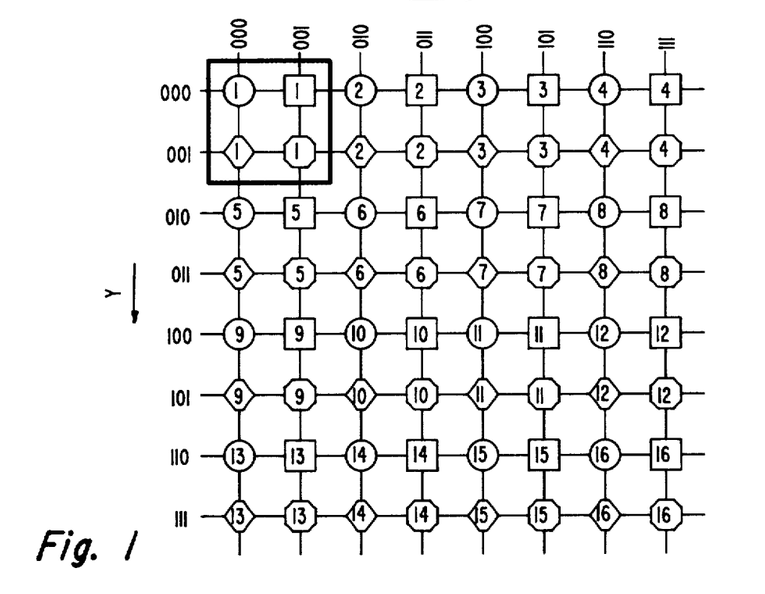
FIG. 1 is a conformal map of data samples to be stored in a memory system in accordance with the present invention, to permit parallel access to several data samples at the same time.

FIG. 1 is a map of the field of sample points that are stored in a conventional row-and-column addressed memory. The sample points are shown as being arranged in horizontal rows running across the paper, in locations specified by x coordinates ascending in value from left to right; and the sample points are shown as being further arranged in vertical columns orthogonal to the rows, in locations specified by y coordinates ascending in value from top to bottom. Four of these points in square array are to be accessed in parallel during each read or write cycle in a memory system embodying the present invention; to facilitate description of this process the sample points are shown in four different forms: circular, square, hexagonal and octagonal. The circular shape is indicative that the row number modulo two and the column number modulo two of the storage location are both ZERO; the square shape, that the former is ZERO and the latter, ONE; the hexagonal shape, that the former is ONE and the latter, ZERO; and the octagonal shape, that they are both ONE.

Imagine now that the sample points are to be raster-scanned to generate an output signal that describes all possible access conditions to or from the memory system, which in actual operation may in fact be randomly addressed or scanned other than by raster scan. The raster scanning is not to be a raster scanning where the sample points are individually scanned by addressing them serially, one at a time, in a relatively high rate location-by-location scanning of each row or column and a relatively slow rate advance through each row or column of the field as its scanning location-by-location is completed, as would be necessary in raster scanning a conventional memory. Rather a plurality of sampling points arranged in array are to be simultaneously accessed in parallel through a "sampling window" during raster-scanning of the storage locations in the memory system. Such a "window" might appear in the FIG. 1 map as a square, for example, as shown in heavy outline surrounding the four storage locations identified by a unity-valued number. In effect, each of the four positions in the scanning window is raster-scanned over every sample point of the FIG. 1 sample point map.

Figure 2:
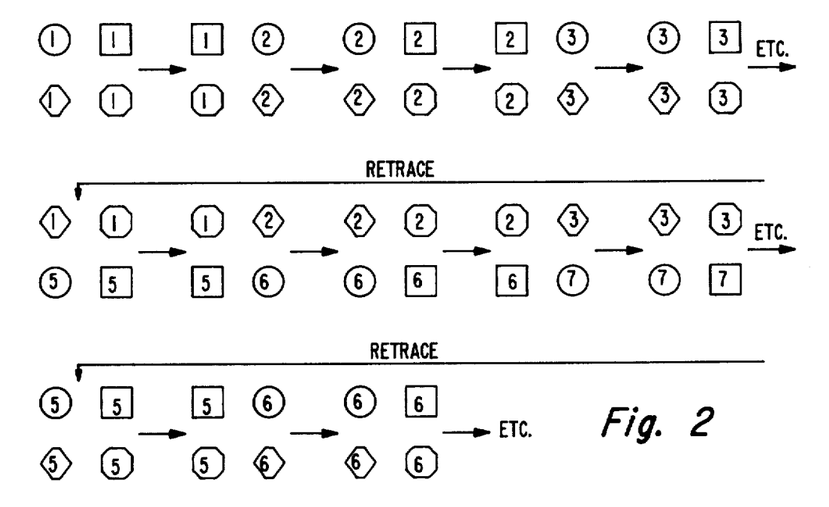
FIG. 2 is a conceptual sketch of the samples obtained from the FIG. 1 memory when a square array of data locations is addressed by raster-scanning.

FIG. 2 shows portions of the successive access patterns through this square window as it scans the FIG. 1 map. The arrows are to direct one through the time sequence of the access patterns through the raster-scanned window, portions of those rows of scan being shown. Note the window always accesses each of the four different types of sample points, one a circle, one a square, one a hexagon, and one an octagon. Note, too, that the leading column of each access pattern into the row scan is the same as the trailing column of the first previous access pattern, and that column addressing must advance by two for a complete change in access pattern with change in position across a row. A similar phenomenon can be noted, looking down a column, for the upper row of the lower access pattern compared to lower row of the upper one, so row addressing must advance by two for a complete change in access pattern with change in position up or down a column. Each storage location (at least those in the center of the memory) is addressed one time for each sample position in the sampling window as the entire memory is scanned, and each time the storage location is addressed, its position in the sampling window differs from the other times.

Figure 3:
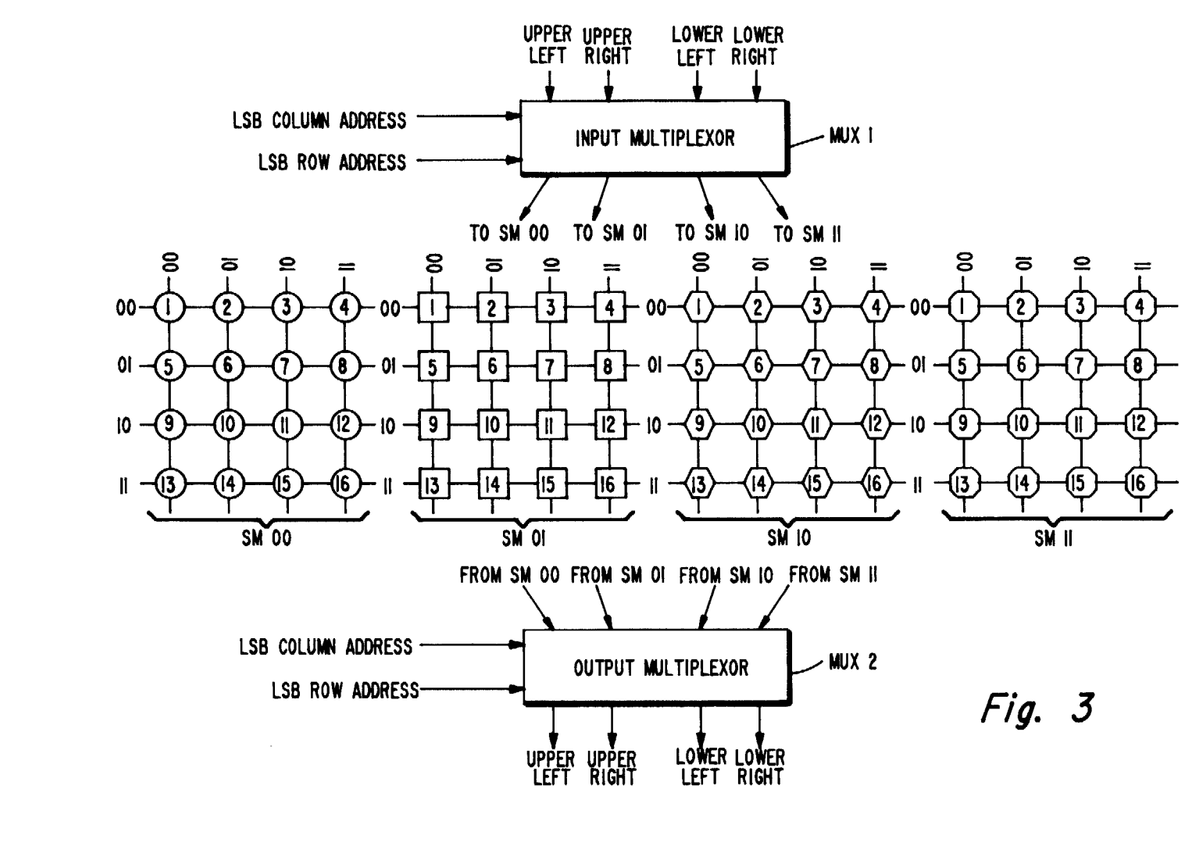
FIG. 3 is a conceptual sketch of a memory embodying the invention.

FIG. 3 shows a rearrangement of the sample points in the FIG. 1 map. This rearrangement separates circular, square, hexagonal and octagonal sample points into individual row and column coordinate systems which can describe data respectively stored in the storage locations of a submemory SM00, a submemory SM01, a submemory SM10, and a submemory SM11. Referring back to FIG. 2, note that every square array of four sample points can be assembled by selecting the sample points from separate respective ones of the submemories SM00, SM01, SM10 and SM11. So each of these submemories can be addressed by row and by column to deliver data from a respective storage location, with no need ever to address two storage locations in a submemory at the same time. All the storage locations in each of these submemories are connected to a common data bus for that submemory, separate from the data busses of the other submemories. These submemories, then, can be off-the-shelf memories, provided a suitable addressing scheme can be devised. The submemories have fewer address lines than the FIG. 1 memory, reflective of the fact that they apportion the total number of storage locations amongst them.

Defer for now consideration of the problem of how to address the submemories, and consider the nature of the multiplexing performed by input multiplexor MUX1 to write data into the FIG. 3 memory and by output multiplexor MUX2 to read data from the FIG. 3 memory. If one moves the square scanning window over the FIG. 1 array of memory storage locations and notes the results, or if one simply observes the scanning patterns shown in FIG. 2, one notes that there are only four positional permutations. Assuming that the position of the square scanning window is expressed in row and column addresses in dimensions y and x, respectively, which describe the sample point in the upper left corner of the window —these permutations are as follows. For x mod 2=0 and y mod 2=0—i.e., the least significant bits of the column and row addresses describing the upper left corner sample point of the scanning window being ZERO—circular, square, hexagonal, and octagonal sample points are in the upper left, upper right, lower left, and lower right corners respectively of the window. For x mod 2=1, y mod 2=0—i.e., the least significant bits of the column and row addresses describing the upper left sample point of the window respectively being ONE and ZERO—square, circular, octagonal and hexagonal sample points are in the upper left, upper right, lower left and lower right corners respectively of the window. For x mod 2=0, y mod 2=1—i.e., the least significant bits of the column and row addresses describing the upper left sample point of the window respectively being ZERO and ONE—hexagonal, octagonal, circular and square sample points are in the upper left, upper right, lower left and lower right corners respectively of the window. And for x mod 2=1, y mod 2=1—i.e., the least significant bits of the column and row addresses specifying window position both being ONE—octagonal, hexagonal, square and circular sample points are in the upper left, upper right, lower left and lower right corners respectively of the window. Input multiplexor MUX1 responds then to the four permutations of the least significant bits of column and row addresses specifying scanning window position to commutate upper left, upper right, lower left and lower right data inputs to storage locations in separate ones of the submemories SM00, SM01, SM10 and SM11 according to the selection pattern set forth just above. Output multiplexor MUX2 similarly responds to the four permutations of the least significant bits of column and row addresses specifying scanning window position to commutate four selected storage locations in the submemories SM00, SM01, SM10 and SM11 to upper left, upper right, lower left and lower right data outputs.

The input multiplexor MUX1 can be dispensed with, of course, if the memory is to be a pre-programmed read-only memory (ROM). A bilateral multiplexor that functions as both input and output multiplexor will be possible with certain forms of memory.

Figure 4:
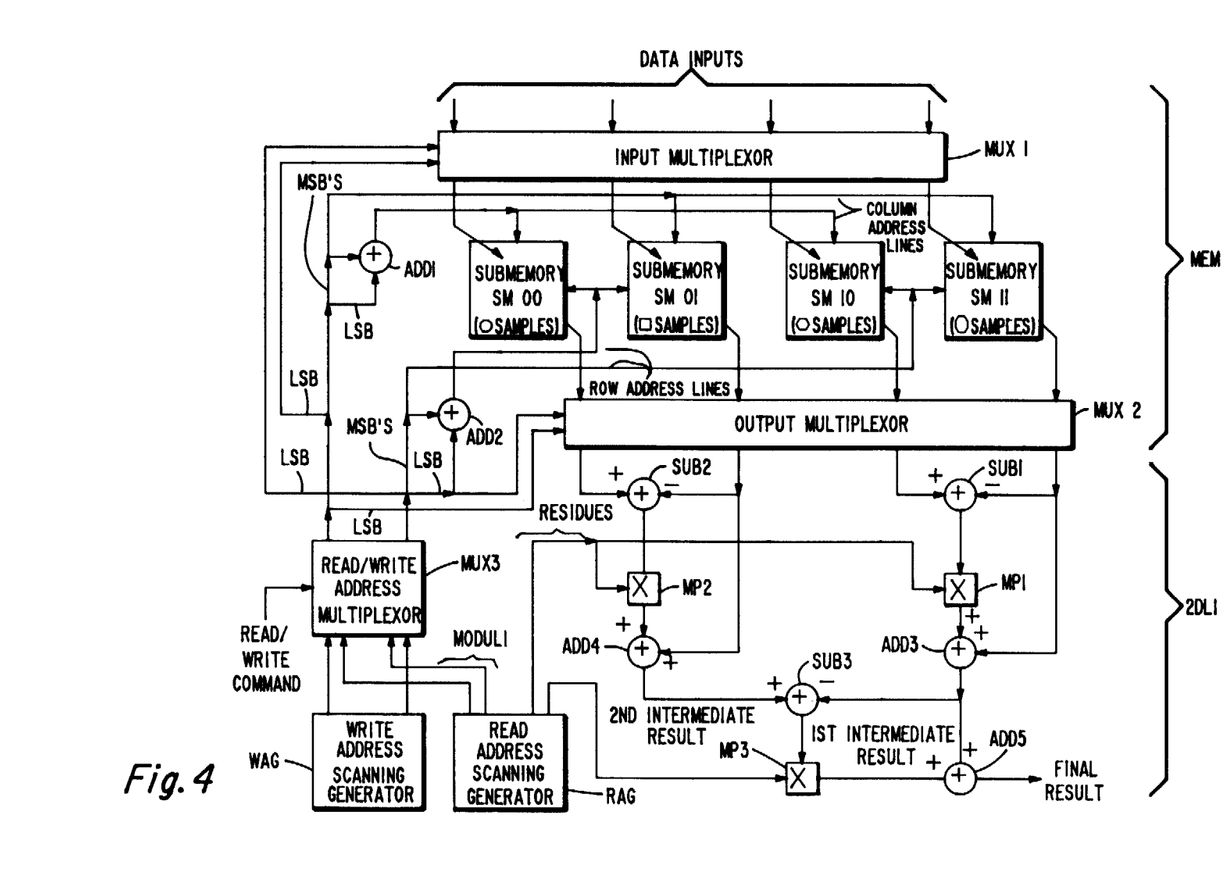
FIG. 4 is a block schematic diagram of that memory connected in system in accordance with further aspects of the invention.

In FIG. 4 a memory MEM shown in block schematic form is similar to the memory shown in conceptual sketch in FIG. 3, except for including more storage locations for storing more sample points. In addition to MUX1, to the submemories SM00, SM01, SM10 and SM11, and to MUX2—the circuitry for addressing the submemory portions of memory MEM is specifically shown. This circuitry includes adders ADD1 and ADD2.

Looking back to FIG. 2, each of the circular, square, hexagonal and octagonal sample points is retained in the scanning window for two successive column addresses during scanning of a row. But the phasing of the advance to new circular and hexagonal sample points is staggered with the advance to new square and octagonal sample points. Dropping the least significant bit of the column addresses to the memory system MEM is used in FIG. 4 to generate column addresses for submemories SM10 and SM11, so there is an advance of the square and octagonal sample point selection every other column address generated during row scanning. To generate the advance of the circular and hexagonal addresses in staggered phase, the least significant bit of the column address is added to its more significant bits in adder ADD1, the result being supplied as column addressing to submemories SM00 and SM10.

Looking back to FIG. 2, each of the circular, square, hexagonal and octagonal sample points appears in the scanning window in successive row positions in each column. So the advance in sample point row selection is at half the rate of change in the row addresses for memory system MEM, and inspection reveals that the phasing of advance for circular and square sample points is staggered with that of the advance for hexagonal and octagonal sample points. This is provided for in FIG. 4 by dropping the least significant bits of the row addresses to the memory system MEM to generate row addresses for submemories SM10 and SM11. The least significant bits of the row addresses to MEM are added to the more significant bits by adder ADD 2 to generate row addresses for submemories SM00 and SM10.

Memory system MEM just described is useful in connection with phantom raster generation for television display processing. Phantom raster generation involves the writing of raster-scanned video information into a memory with storage locations being scanned in one raster during that writing, and the subsequent reading out of the stored information from memory with storage locations being scanned with a raster different in size or orientation. The order of writing and reading the memory are both raster-scanning series of coordinates descriptive of points in a field of data sample points (such as the field shown in FIG. 1 but including more sample points). It is convenient to have a write address scanning generator WAG which generates integral row and column read addresses of the memory system MEM, which are applied to memory system MEM through a read/write address multiplexer MUX3 responsive to a WRITE COMMAND applied to MUX3 command input. Raster-scanning of one sample point at a time is usually the most convenient way to load memory system MEM when a baseband video signal is supplied in real time, in which case this signal is loaded through just one input of MUX1, while the other inputs are held at the no-signal condition. The unused capability of MUX1 under such input loading conditions permits its replacement by a simple one-of-four selector circuit, if the submemories are supplied WRITE ENABLE signal one at a time in proper sequence; rather than in parallel as when MUX1 is used. Data loaded from another memory, on the other hand, can be more quickly loaded by utilizing the parallel loading capability of MUX1 to load data four sample points at a time.

Responsive to a READ COMMAND applied to MUX command input, MUX3 applies to memory system MEM the integral portion or modulus of read addresses generated by a read address generator RAG. The read addresses from read address generator RAG, which represent a scan conversion from the write addresses supplied by write address generator WAG, generally are non-integral and have—in addition to their integral modular portions—fractional residual portions, which residues are supplied to a two-dimensional linear interpolator 2DLI to govern interpolation between data stored at four storage locations, the integral addresses of which are those closest to and surrounding the read address generated by generator RAG. The desire to furnish four sample points at a time from memory to facilitate the two-dimensional linear interpolation process is the underlying reason for subdividing memory into four submemories SM00, SM01, SM10, and SM11.

In interpolator 2DLI the data from two sample points in the one of the two rows being simultaneously addressed which row has the lower row address are differentially combined in subtractor SUB1; and the data from two sample points in the other of the two rows being simultaneously addressed, which row has the next higher row address, are differentially combined in subtractor SUB2. The points with lower column addresses are used as subtrahends and the points with higher column addresses are used as minuends in these subtraction processes.

The differences resulting from these subtraction processes are multiplied by the residue of the row coordinate of read address in multipliers MP1 and MP2, respectively, and added to the subtrahend sample points in adders ADD3 and ADD4. This generates first and second intermediate interpolation results at the respective outputs of adders ADD3 and ADD4. The first intermediate interpolation result is subtracted from the second in a subtractor SUB3 and the result multiplied by the residue of the read column address in multiplier MP3 to yield a product, which product is then added to the first intermediate interpolation result in adder ADD5 to yield the final interpolation result.

The two-dimensional linear interpolation alternatively can be carried out with one-dimension linear interpolations between sample points in the same columns, these interpolations being governed by the residue of the column read address, followed by one-dimensional linear interpolation between the intermediate results to obtain the final interpolation result, this last interpolation being governed by the residue of the column read address. Still further variations are possible with different choices as to which sample points are chosen as minuend and subtrahends in the subtraction process, which variations involve one-dimensional linear interpolations governed by the complement of one or other or both of the read address residues.

Figures 5, 6:
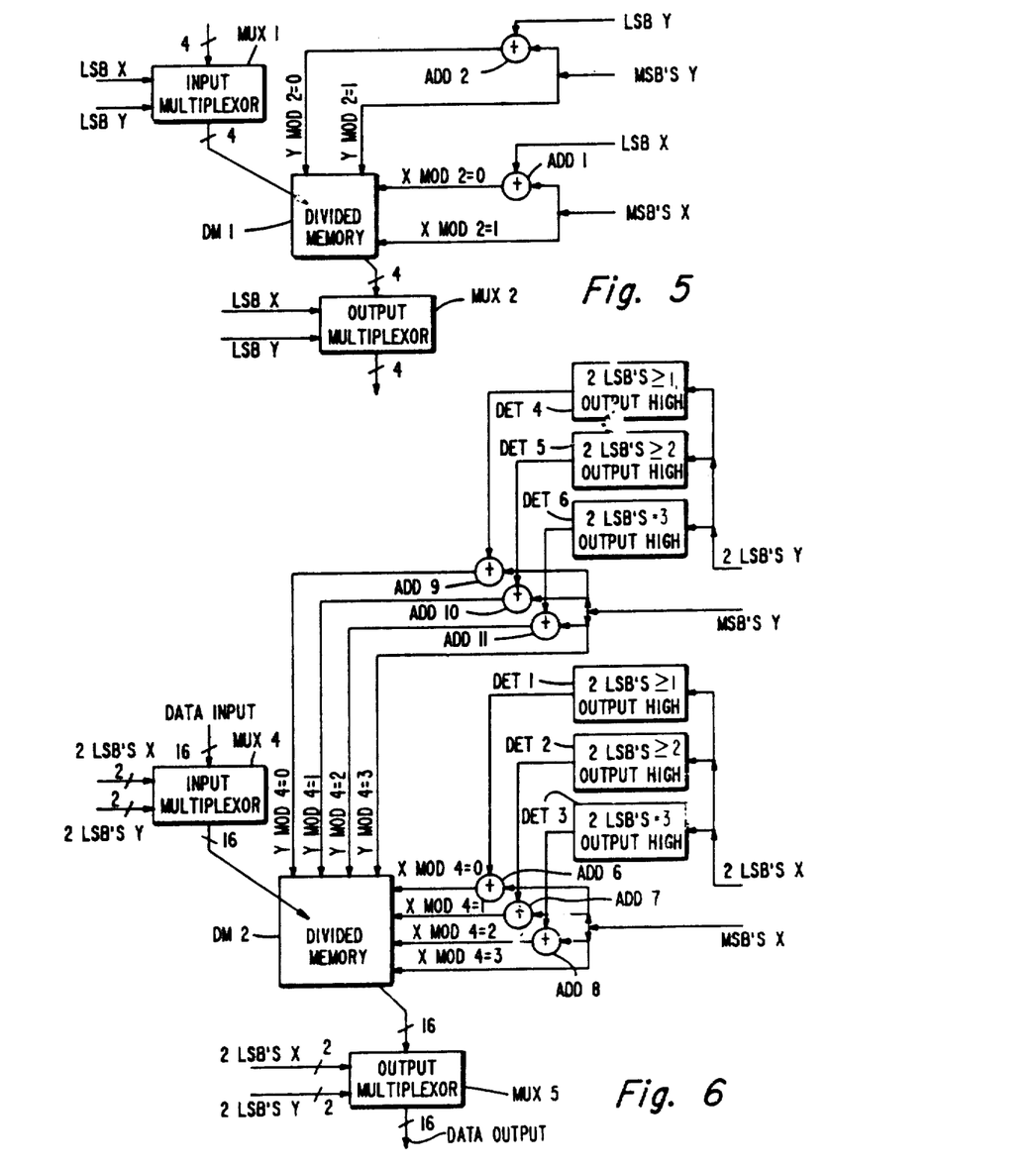
FIG. 5 is a a stylized block schematic diagram of the memory of FIGS. 3 and 4.
FIG. 6 is a stylized block diagram of another memory embodying the invention, useful in understanding the general design principles for memories embodying the invention.

While the interpolation process is shown carried out by apparatus for arithmetic calculations in FIG. 5, interpolation between or among spatially adjacent data can also be carried out using read-only memory, as known in the art. Using read-only memory for interpolation is particularly useful where the interpolation is of a type where the data are weighted using a weighting function other than the right square pyramid associated with linear interpolation—e.g. a Bessel function divided by its radial argument.

The nature of the scan conversion as between the write addresses and read addresses respectively supplied by address generators WAG and RAG may be simply an adjustable scaling factor between two sets of Cartesian-coordinate addresses which controls the amount of squeeze or zoom of the display image stored in memory system MEM, for example. Such address generators are simply constructed using respective counters to generate respective column addresses at relatively rapid rates by counting gated pixel clock pulses supplied to them at pulse repetition rates in ratio depending on the degree of squeeze or zoom desired, and using respective counters to generate respective row addresses at relatively slow rates by counting line clock pulses supplied to them at pulse repetition rates in ratio depending on the degree of squeeze or zoom desired.

The scan conversion may be between two sets of Cartesian coordinate addresses rotated from each other, as well, with or without attendant squeeze or zoom. Cartesian-to-polar coordinate scan conversion or polar-to-Cartesian coordinate scan conversion can also be done.

FIG. 5 shows MEM in a more stylized block diagram where the divided memory DM1 is shown in a single block, rather than as four submemories SM00, SM01, SM10, and SM11. FIG. 5 is used to establish a drawing convention that is helpful in depicting, by block diagram, memories that are divided into more than four submemories. Such memories can be used, for example, to supply data for calculations of interpolations using cubic or still higher odd-order polynomial approximations in each spatial dimension.

FIG. 6 shows a memory system with a memory DM2 divided into sixteen submemories to provide a square scanning window four sample points on side. The two least significant bits of each of the column and row address coordinates control the operation of input multiplexor MUX4, selectively applying data input lines to the data busses of the submemories in divided memory DM2, and of output multiplexor MUX5 selectively connecting those submemory data busses to data output lines.

Memory DM2 is divided to provide a scanning window $2^m \times 2^n$ sample points where $m=n=2$ whereas memory DM1 was divided to provide a scanning window of $2^m \times 2^n$ sample points where $m=n=1$. Using a scanning window, the dimensions of which in numbers of column and row addresses are integral powers of two, simplifies generating row and column addresses for the submemories in that the necessary processes of division by scanning window side length can be carried out without need for digital division, by simply truncating the column and row addresses originally supplied by the address generators, and in that the conversion of the originally supplied addresses to modulo scanning-window-side-length terms for controlling the input and output multiplexors is automatically provided by taking the bits left over from the truncation processes. The simplified division without appreciable time delay afforded when the hardware is addressed in binary numbers is so great that if one desires a scanning window of dimensions $2^m \times 2^n$ where m or n is non-integral or both m and n are non-integral, it is simplest to use a scanning window with the next $2^m \times 2^n$ dimensions where m and n are integral and use only the portion of the data outputs from the memory output multiplexor that define the desired portions of the scanning window. This same stratagem is used where the required access patterns to memory are non-rectangular. It is possible, however, to design memory systems where the column and row addresses are binary-coded numbers to radices other than two, which are multiples of non-power-of-two scanning window dimensions, to facilitate fast division. But the amount of hardware involved in the binary coding usually makes this approach less attractive. Variations where memory addressing is done with signed, rather than unsigned, numbers are also possible.

Returning to particular consideration of the FIG. 6 memory system, the general nature of the process by which sample points are dropped out of the scanning window as it makes its scan becomes more apparent than in the FIG. 5 memory system. The column addresses have their two least significant bits diverted to supply inputs to detectors DET1, DET2 and DET3 which respond with output ONE when these bits equal or exceed unity, two, and three respectively. The more significant bits are applied as inputs to adders ADD6, ADD7 and ADD8 and as column addressing to the columns in sample-point space having column addresses equal to three in modulo-four numbering. The outputs of adders ADD6, ADD7, and ADD8 are applied as column addressing to the columns in sample-point space having column addresses equal to zero, one, and two in modulo-four numbering. Analogously, the row addresses have their two least significant bits diverted to supply inputs to detectors DET4, DET5, and DET6 which respond with output ONE when these bits equal or exceed unity, two, and three respectively; and the more significant bits are applied as inputs to adders ADD9, ADD10, and ADD11 and as row addressing to the rows in sample-point space having row addresses equal to three in modulo-four numbering. The outputs of adders ADD9, ADD10, and ADD11 are applied as row addressing to the rows in sample-point space having row addresses equal to zero, one, and two in modulo-four numbering. For the condition where the least significant bits of column and row address coordinates are both 00, the more significant bits of these addresses are supplied without modification as column and row addresses to each of the submemories in divided memory DM2.

Advancing the scanning window one column in a direction parallel to that of the rows increments column address and as its two least significant bits equal 01 as determined by detector DET1, its output changes from ZERO to ONE. This ONE, applied to the input of adder ADD6 other than the one which receives the more significant bits of column-address x coordinate, causes the output of ADD6 applied as column address to those submemories storing the present first column in the scanning window to increment, and to remain incremented until the two least significant bits of column address roll over to 00 once again. The column addresses for other submemories remains unchanged.

Advancing the scanning window one column more in the same direction, incrementing column address so its two least significant bits equal 10, keeps the output of detector DET1 at ONE and changes the output of detector DET2 to ONE as well. The outputs of adders ADD6 and ADD7 are both one more than the most significant bits of input column address, so the submemory storing the present first column in the scanning window is advanced to the next positon to be together with the present second column, which had been first column for the previous input column address.

Advancing the scanning window still one more column, so the least two significant bits of input column address are 11, causes the output of DET3 to increment to ONE while the outputs of DET1 and DET2 remain at ONE. The first three columns in the scanning window are now supplied with incremented column addressing from the outputs of adders ADD6, ADD7 and ADD8. The next input column address, as scanning window advances another column along the same row, returns the least two significant bits of that address to 00, and the entire updating of the scanning window columns is completed.

Scanning along columns of the sample-point space one row at a time is similar to the scanning along a row one column at a time just described. The functions of detectors DET4, DET5, DET6 and adders ADD9, ADD10, ADD11 in modifying row addresses are described in syntactically similar way to the functions of detectors DET1, DET2, DET3 and adders ADD6, ADD7, ADD8 in modifying column addresses.

Consider now how detectors DET1, DET2, DET3, DET4, DET5, and DET6 may be constructed. Perhaps the first way that comes to mind is to use digital comparators receiving the least significant bits of an address coordinate as one input and the limit value these bits are to equal or exceed as the other input. Another way to construct a detector with output high for an m-bit or n-bit input of the least significant bits of a column or row address equaling or exceeding a limit value is to apply them as an input to an adder, the other input of which is the limit value, and sensing the overflow from the adder as the detector output. Still another way to construct the detector is to use a flip flop reset by output from a NAND gate to which the least significant bits of the address coordinate are supplied and set by decoding limit value in the least significant bits; detector output is then the true output of the flip flop.

Referral back to the FIG. 5 memory system suggests that the condition of the least significant bits themselves can be ascertained and used to determine whether the adders in the address lines are or are not supposed to receive a ONE to increment the more significant bits of the column and row addresses. After some thought one may observe that the condition that the m (or n) least significant bits equal or exceed $2^{m/2}$ (or $2^{n/2}$) is specified simply by checking the condition of the most significant or the least significant bits to see if it be ONE. The condition that the m (or n) least significant bits equal or exceed unity in value can be determined by ORing those bits in an OR gate and the condition that the m (or n) least signifcant bits equal or exceed m−1 (or n−1) in value can be determined by ANDing those bits in an AND gate.

In tabular form, then, the logic functions that can determine whether a two-bit number ab, written more significant bit first, equals or exceeds a limit variable l can be tabulated as follows:

| l | equation defining detector output ONE |
|---|---|
| 01 | $a+b=1$ |
| 10 | $a=1$ |
| 11 | $a \cdot b = 1$ |

The logic functions that determine whether a three-bit number, abc, written most significant bit first equals or exceeds a limit variable l can be tabulated as follows:

| l | equation defining detector output ONE |
|---|---|
| 001 | a+b+c=1 |
| 010 | a+b=1 |
| 011 | a=(b·c)=1 |
| 100 | a=1 |
| 101 | a·(b+c)=1 |
| 110 | a·b>1 |
| 111 | a·b·c=1 |

The logic functions that determine whether a four-bit number abcd, written most significant bit first, equals or exceeds a limit variable l can be tabulated as follows:

| l | equation defining detector output ONE |
|---|---|
| 0001 | a+b+c+d=1 |
| 0010 | a+b+c=1 |
| 0011 | a+b+(c·d)=1 |
| 0100 | a+b=1 |
| 0101 | a+[b·(c+d)]=1 |
| 0110 | a+(b·c)=1 |
| 0111 | a+(b·c·d)=1 |
| 1000 | a=1 |
| 1001 | a·(b+c+d)=1 |
| 1010 | a·(b+c)=1 |
| 1011 | a·[b+(c·d)]=1 |
| 1100 | a·b=1 |
| 1101 | a·b[(c+d)]=1 |
| 1110 | a·b·c=1 |
| 1111 | a·b·c·d=1 |

Comparison of the logic equations with the patterns of ONE's in the columns of succeeding l limit variables will disclose the relationships used in generating the logic equations, so that equations for still longer plural-bit numbers can be generated where desired. Since the detector truth equations share many common terms, considerable reduction can be carried out in the AND and OR gate networks realizing the detectors. These networks tend to be more economical of gates than standard digital comparators.

The memory systems shown in FIGS. 5 and 6 use square scanning window of $2^m \times 2^n$ sample points, where m=n but other rectangular windows, where m≠n, are feasible. The scanning window can be degenerated to a scanning line segment by m or n being made equal to zero in memory systems embodying the invention, as well. Conventional row-and-column-addressed two-dimensional memories can be stacked up using input and output multiplexers for achieving another addressing dimension, thereby creating a three-dimensional memory. The techniques just described can be extended to permit a scanning parallelepiped to be used as the "window" for simultaneously accessing a three-dimensional array of samples in such a memory. Indeed, the inventive teaching extends to multiple-dimension memories, no matter what the multiplicity of dimension is.

Figure 7:
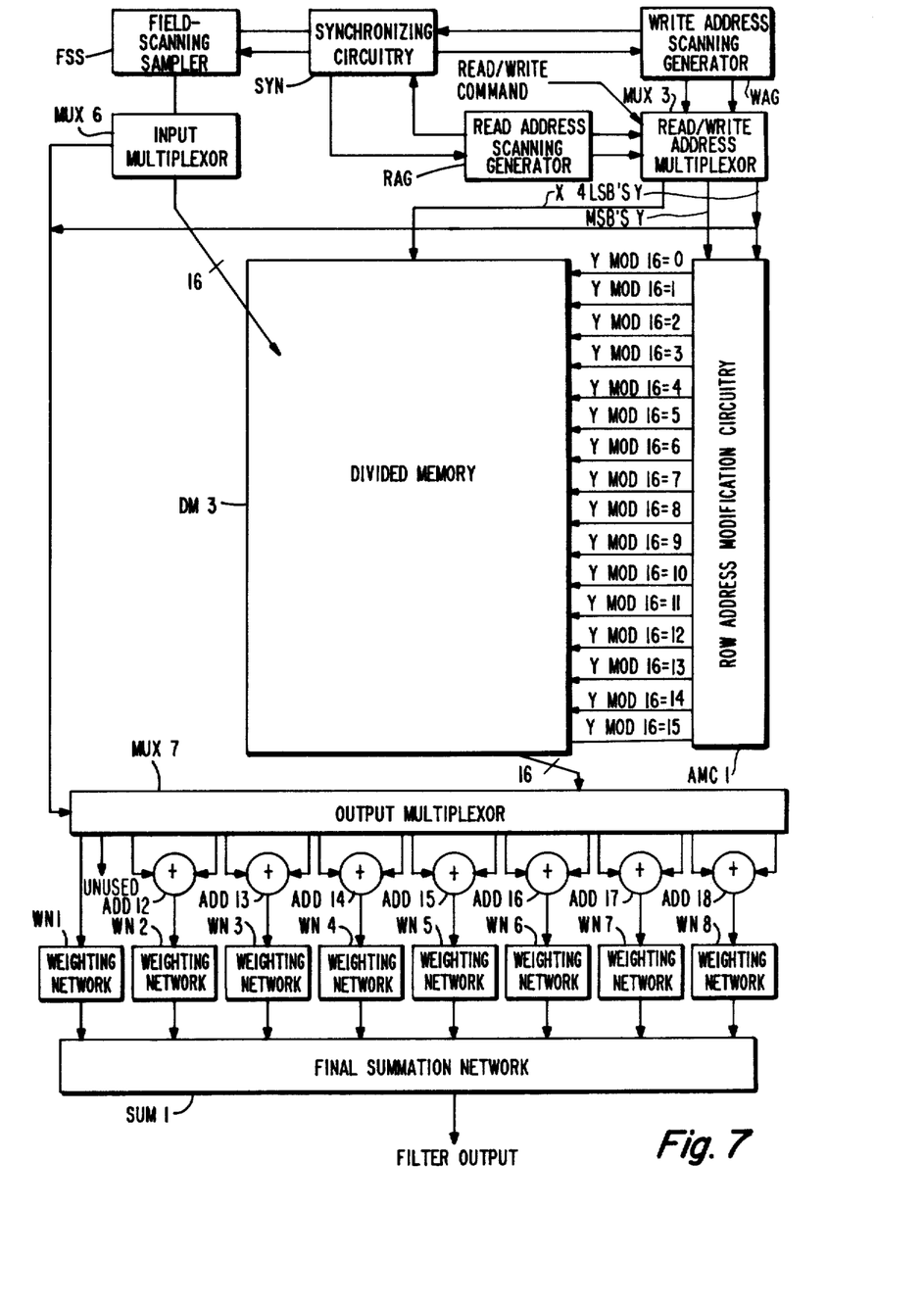
FIGS. 7 and 8 are block schematic diagrams of one-dimensional and two-dimensional spatial-frequency low-pass filters, respectively, each constructed in accordance with further aspects of the invention.

FIG. 7 shows a one-dimensional spatial-frequency low-pass filter as may be used to reduce resolution in the samples of field intensity taken over a two-dimensional space by a field-scanning sampler FSS. FSS samples the field on a regular scanning basis selecting scan lines at a relatively low rate and then scanning samples along each scan line at a relatively rapid rate; this sampling process may be the conventional raster scan used in video displays, for example. One-dimensional spatial-frequency low-pass filtering in the spatial direction along scan lines is easily carried out by weighting the samples in successive stages of a shift register supplied successive scan lines of the field samples as input, but one-dimensional spatial-frequency filtering in the spatial direction orthogonal to the scan lines requires shift registers of many scan lines length, as known. In many field scanning systems, however, a field storage memory stores field intensity information for a complete field—e.g. television broadcast studio apparatus often includes frame squeeze or zoom apparatus or includes frame freeze apparatus—in which case it would be convenient to do spatial-frequency filtering selecting samples from field memory already required for other purposes. The FIG. 7 low-pass filter performs spatial-frequency filtering in a direction orthogonal to the x direction along which field scan lines are presumed to extend.

Synchronizing circuitry SYN synchronizes the generation of write addresses by write address generator WAG, the generation of read addresses by read address generator RAG, and the generation of field intensity samples by FSS. MUX3 responds to WRITE COMMAND to select write address generator WAG to supply addresses to divided memory DM3 during its write cycle. MUX3 responds to READ COMMAND to select read address generator RAG to supply addresses to divided memory DM3 during its read cycle. Field storage memories are customarily operated in pairs with their read and write cycles alternating each successive field scan and interleaving to provide constant field sample throughput, though only one memory DM3 of such a pair is shown in FIG. 7. Such a pair of memories can be operated with parallelled data input lines and parallelled data output lines, with their time-division multiplexing controlled by selective application of the READ ENABLE and WRITE ENABLE signals employed with most modern memories, allowing shared use of a common input multiplexor MUX6 to commutate field samples from sampler FSS to appropriate submemory portions of divided memory DM3 and the divided memory paired with DM3, and also allowing shared use of a common output multiplexor MUX7. Address multiplexor MUX3 alternates read and write addressing to both memories on successive fields to interleave their write and read cycles.

Divided memory DM3 has its rows storing respective scan lines of field intensity information divided into sixteen groups as determined by y address modulo sixteen, and row storing scan lines of like modulo sixteen value are arranged together in a respective one of sixteen submemories. Row address modification circuitry AMC1 responds to the four least significant bits of y address to modify the more significant bits of the y address to supply y addresses to these submemories, AMC1 being of the nature previsouly disclosed in detail. The x addressing of the submemories in divided memory DM3 is done completely in parallel. The four least significant bits of y address control the commutation of access to the submemories in memory DM3 by input multiplexor MUX6 during writing by output multiplexor MUX7 and during reading.

During the read cycle of memory DM3 output multiplexor MUX7 supplies sixteen samples in a straight line perpendicular to the direction of line scan. One of the end samples is not used, since low-pass spatial filtering customarily uses an odd number of samples. The fifteen remaining samples are combined by weighted summation to provide an output signal sample with curtailed spatial-frequency response in the direction to which scan lines are perpendicular, just as fifteen samples from a shift register storing successive samples along a scan line are combined by weighted summation in the prior art, to provide an output signal sample with curtailed spatial-frequency response in the direction to which scan lines are parallel. More particularly, the envelope of the weights ascribed to the odd number of used sample points is described by the unit impulse response of a filter with prescribed spatial-frequency response, as transformed from the spatial-frequency domain to the spatial domain; and the digital filter performs a truncated convolution of the filter response to unit impulse and the field intensity sample data.

The unit impulse response is symmetric about the midpoint sample in the line of samples, odd in number, used in the spatial filtering. The midpoint sample is supplied to weighting network WN1, typically a ROM, which furnishes a weighted response as first input to the final summation network SUM1. The two samples one sampling distance from midpoint sample are to be weighted equally; to avoid the need for separate weighting networks for them, they are added together in adder ADD12 and their sum is supplied as input to a shared weighting network WN2. Analogously, adder ADD 13 adds the two sample points two sampling distances from midpoint sample to furnish input to weighting network WN3; adder ADD14 adds the two sample points three sampling distances from midpoint sample to furnish input to weighting network WN4; adder ADD15 adds the two sample points four sampling distances from midpoint sample to furnish input to weighting network WN5; adder ADD 16 adds the two sample points five sampling distances from midpoint sample to furnish input to weighting network WN6; adder ADD 17 adds the two sample points six sampling distances from midpoint sample to furnish input to weighting network WN7; and adder ADD18 adds the two sample points seven sampling distances from midpoint sample to furnish input to weighting network WN8. The responses from weighting networks WN2, WN3, WN4, WN5, WN6, WN7, and WN8 are applied as second, third, fourth, fifth, sixth, seventh, and eighth inputs to final summation network SUM 1 to sum them and its first input together to furnish a sample of the filtered output response to field intensity samples supplied by sampler FSS.

Figure 8:
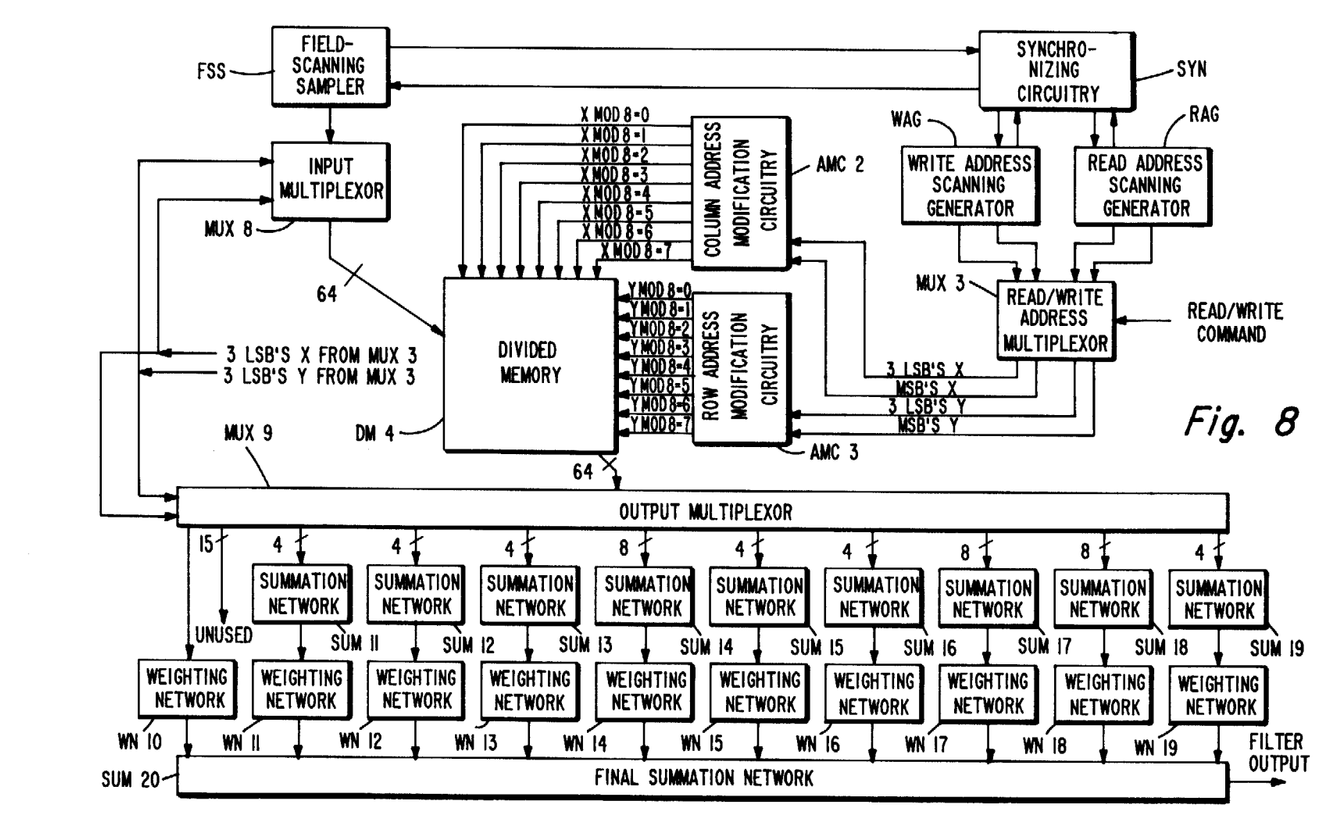

FIG. 8 shows a two-dimensional spatial-frequency low-pass filter. Certain two-dimensional spatial-frequency filtering problems involve inseparability of the filtering into separate one-dimensional spatial-frequency filtering procedures that can be successively performed; an example of this is the reduction of spatial-frequency resolution to equal amounts in all directions in a field of samples taken in a two-dimensional space, which requires a low-pass filter with a circular cut-off in the two-dimensional spatial-frequency domain. The filter shown uses a divided memory DM4 with sixty-four submemories. During the memory write cycle, the sixty-four submemories of DM4 are successively loaded with respective field intensity samples by an input multiplexor MUX8, the selection being controlled by the three least significant bits of x write address and the three least significant bits of y write address. During the memory read cycle the sixty-four submemories are accessed through a scanning window, with their connecitons to the output data lines selected by an output multiplexor MUX9 controlled by the three least significant bits of x write address and the three least significant bits of y write address. Column address modification circuitry AMC2 responds to the three least significant bits of x read or write address from address multiplexor MUX3 to modify the more significant bits of that address to supply the x addresses for the DM4 submemories, and row address modification circuitry AMC3 responds to the three least significant bits of y read or write address from MUX3 to modify the more significant bits of that address to supply the y addresses for the DM4 submemories. Address modification circuitry AMC2 and AMC3 is of the nature previously described. Of the sixty-four outputs available from output multiplexor MUX9, forty-nine of them in $7 \times 7$ array are used to supply the sample points to be used in filtering.

A rectangular array with odd number of sample points on each side is normally used in these filters. The sample points supplied in parallel from MUX9 are combined in a weighted summation to yield a filtered field-intensity sample. The envelope of the weights ascribed to the rectangular array of sample points is described by the two-dimensional unit impulse response of a filter with the prescribed two-dimensional spatial-frequency response, this envelope is the first Bessel function of a radial coordinate variable, divided by that variable, in the case of a low-pass filter with circular pass band in the spatial-frequency domain. The two-dimensional spatial-frequency filters display quadrantal symmetry and, in the special case where they are symmetric in x and y, octantal symmetry. The FIG. 8 filter is presumed to fall into the special case. Accordingly, responses at equal sampling distance from the central sampling point in the $7 \times 7$ scanning window are summed in summation networks SUM11, SUM12, SUM13, SUM14, SUM15, SUM16, SUM17, SUM18 and SUM19. The resulting sums are weighted in weighting networks WN11, WN12, WN13, WN14, WN15, WN16, WN17, WN18, and WN19, respectively, and the weighted sums supplied as inputs to a final summation network SUM20 along with the weighted response of weighting network WN10 to the central sample point in the $7 \times 7$ scanning window. The output of the final summation network SUM20, the sum of its inputs, is the filtered output response to the field intensity samples supplied as input to the filter.

Memories storing sample points in analog or digital form can be used in connection with the invention. In digital memory embodying the invention each submemory typically comprises a plurality of planes addressed in parallel by row and by column, each plane storing a respective bit of a binary number expressing the value of the sample point.

In the claims which follow, the distinction between "column" and "row" is one of semantics only. Each of the claims is to be considered to be of such scope that its scope remains unaltered by the replacement of "column" at all places it appears by "row", together with the replacement of "row" at all places it appears by "column".

What is claimed is:

1. A memory system comprising:
    a plurality $2^{m+n}$ in number of component memories each respectively identified by a distinct combination of binary column and row numbers topologically descriptive of its position in a hypothetical $2^m$ by $2^n$ matrix, the column number thus associated with each component memory being at least one but no larger than $2^m$ and the row number associated with each component memory being at least one but no larger than $2^n$, where m and n are positiive integers at least one of which exceeds zero, each component memory having a respective data bus, each component memory having p respective column address lines for receiving a respective component memory column address, and each component memory having q respective row address lines for receiving a respective component memory row address, where p and q are positive integers larger than one;

means for generating memory system column addresses one at a time, each with p more significant bits and m less significant bits, the degrees of significance being respective to each other;

means for generating memory system row addresses one at a time, each with q more significant bits and n less significant bits, the degrees of significance being respective to each other;

a multiplexor for selectively accessing the data busses of said component memories in a succession of patterns according to the m less significant bits of the current said memory system column address and the n less significant bits of the current said memory system row address;

means for applying the p more significant bits of the current said memory system column address to a set of component memories identified by column number of $2^m$, as their component memory column address;

respective means associated with each other set of component memories identified by respective like column number for applying, as their component memory column addresses, the p more significant bits of the current said memory system column address each associated means for applying receives as one of a pair of respective input signals, applying them either directly or as augmented by unity, responsive to the other of its respective input signals;

means for determining whether the m less significant bits of the current said memory system column address equal or exceed the column number of each said other set of memories to generate the respective said other input signal received by the means for applying component memory column address associated with said other set of memories identified by the column number which contributed to the generation of that said other input signal;

means for applying the q more significant bits of the current said memory system row address to said component memories identified by row number of $2^n$, as their component memory row address;

respective means associated with each other set of component memories identified by respective like row number for applying, as their component memory row addresses, to each other set of memories identified by the same row number the q more significant bits of the current said memory system address each associated means for applying receives as one of a pair of its respective input signals, applying them either directly or as augmented by unity, responsive to the other of its respective input signals;

means for determining whether the n less significant bits of the current said memory system row address equal or exceed the row number of each said other set of memories to generate the respective said other input signal received by the means for applying component memory row address associated with said other set of memories identified by the row number which contributed to the generation of that said other input signal; and means, responsive to data supplied in parallel from said component memories via said selectively accessed data busses for combining said parallelly supplied data in prescribed proportions.

2. A memory system comprising:

a plurality $2^n$ in number of component memories identified by a distinct set of binary row numbers topologically descriptive of its position in a hypothetical $2^n$ by unity matrix, each row number being at least one but no larger than $2^n$, each component memory having a respective data bus, each component memory having p respective column address lines for receiving a respective component memory column address, and each component memory having q respective row address lines for receiving a respective component memory row address, where n is a positive integer at least one and p and q are positive integers larger than one;

means for generating memory system column addresses one at a time, each with p bits;

means for generating memory system row addresses one at a time, each with q more significant bits and n less significant bits, the degrees of significance being respective to each other;

a multiplexor for selectively accessing the data busses of said component memories in a succession of patterns according to the n less significant bits of the current said memory system row address;

means for applying the p bits of the current said memory system column address to said component memories in parallel as their column address;

means for applying the q more significant bits of the current said memory system row address to said component memory identified by row number of $2^n$, as its component memory row address;

respective means associated with each other component memory for applying, as its component memory row address, the q more significant bits of the current said memory system address each associated means for applying receives as one of a pair of respective input signals, applying them either directly or as augmented by unity, responsive to the other input of its respective signals;

means for comparing the n less significant bits of said memory system row address to the row number of each said other component memory to generate said other input signal received by the means for applying row address to that component memory identified by the row number which contributed to the generation of that said other input signal, said other input signal commanding application of the q more significant bits of the current said memory system row address directly if its n less significant bits are less than the row number and otherwise commanding application of the q more significant bits of the current said memory system row address augmented by unity; and means, responsive to data supplied in parallel from said component memories via said selectively accessed data busses, for combining said parallelly supplied data in prescribed proportions.

3. A memory system providing n-dimensional spatial filtering, n being an integer at least unity, said memory system comprising:
- apparatus for concurrently supplying during write times a plurality n in number of multiple-bit write addresses, each descriptive of locations of sample points in a respective dimension of sample data space and each separable into relatively more significant and less significant portions, and data descriptive of values of a function as sampled at those sample points;
- apparatus for supplying during read times multiple-bit read addresses in each of the n dimensions, which addresses describe the locations of those sample points and are each separable into relatively more significant and less significant portions;
- a plurality of stores for storing respective ones of points of different-modulus addresses with modulus size determined in accordance with an n-dimensional array of contiguous points in space;
- means for selectively accessing one of said plurality of stores to be written into, which includes
- means for addressing at least the selectively accessed one of said plurality of stores with the more significant portions of the multiple-bit write addresses applied either directly or offset by unity, and
- means responsive to the less significant portions of the multiple-bit write addresses for selectively connecting the selectively accessed one of said stores to receive the data descriptive of the function is to be written therein;
- means for simultaneously accessing all of said plurality of stores during reading, which includes
- means for addressing each of said plurality of stores with the more significant portions of the multiple-bit read addresses in each of the n dimensions applied either directly or offset by unity, and
- means for permuting responsive to the less significant portions of the multiple-bit read addresses the outputs of said stores according to their respective positions in said array to scan said array across said sample data space;
- means for weighting the outputs of said stores as supplied in said array respective to each other from said means for permuting; and
- means for linearly combining the weighted outputs to generate a spatially-filtered response to said function.

4. In the combination of
- means for generating streams of spatial coordinates forming addresses descriptive of sample-data-scanned points in a plural-dimensional field, said spatial coordinates each consisting of a more significant and a less significant portion with respect to each other;
- means for supplying a respective set of sample data concerning a number of sample points in a region of said field enclosing each currently addressed one of said scanned points, which sample points have spatial coordinates the less significant portions of which are zero-valued; and
- interpolator means, responsive to the less significant portions of the spatial coordinates in each successive address and to the set of data concerning sample points in the region of the field including the scanned point with that address, for supplying an interpolative response - the improvement wherein said means for supplying a respective set of sample data concerning a number of points in a region of said field enclosing each currently addressed one of said scanned points includes a memory system allowing parallel accessing of each set of sample data and being of the type, known generally, comprising:
- a plurality of output lines on which each set of sample data concerning the number of sample points in said region are supplied to said interpolator means;
- respective means for dividing the more significant portion of said spatial coordinates in each dimension by a number at least as large as the maximum number of sample points in said region along that dimension, to obtain and integral quotient with a residue modulo the number used as divisor left over;
- a plurality of component memories corresponding to the total number of possible residue conditions, said component memories arranged in a hypothetical plural-dimensional array according to their associated residue condition in each dimension;
- means for applying the integral quotient in each dimension as an address coordinate to each of said submemories having a possible residue condition associated therewith at least as large as the residue supplied by said means for dividing;
- means for applying the integral quotient in each dimension augmented by unity as an address coordinate to each of said component memories having a possible residue condition associated therewith smaller than the residue supplied by said means for dividing; and
- a multiplexor responsive to said residues as collectively supplied for selectively accessing said component memories to said output lines.

5. A combination as set forth in claim 4 wherein said means for generating streams of spatial coordinates is of a type where such streams of spatial coordinates describe a regular scanning of said field in each of its dimensions.

6. A memory system comprising:
- at least one input line;
- a plurality of output lines;
- a plurality of internal data busses;
- a relatively large number of storage locations for storing respective samples of points in a plural-dimensional field, apportioned in respective submemories each accessed through a respective one of said plurality of internal data busses;
- means for selectively accessing via respective ones of said output lines a plurality of said storage locations in parallel at a time, which parallelly accessed storage locations are arranged in an array of sample points occupying a region of said field, said region having a disposition within said field as indicated by address coordinates in each dimension of said field descriptive of the location of a particular one of the points in said array within said field, whereby said array is an access window that scans the plural-dimensional field in accordance with change in the address coordinates of said particular point, said means including
- respective means for dividing the address coordinate in each of said dimensions by the number of sample points in the corresponding dimension of said access window to obtain an integral quotient, with the address coordinate modulo that number of sample points left over as a residue, a multiplexor responsive to said residues as collectively supplied for selectively connecting said internal data busses to said output lines, respective means for determining how the residue of each address coordinate compares in magnitude to each different possible value thereof except one value, in each case indicating a first condition by output ZERO or a second condition by output ONE, combining the integral quotient obtained from each address coordinate with each of the determinations with respect to the residue of that address coordinate, to be used together with the integral quotient itself to form a set of address coordinates in a dimension, and means for developing each different permutation of address coordinates in the plural dimensions of the field and applying the permutation to a respective one of said submemories; and means responsive to said residues for selecting which of said internal data busses each input line connects to.

7. A memory system as set forth in claim 6 included in combination with:

means for generating a stream of address coordinates describing a regular scanning of said field in each of its dimensions; and means for providing a weighted summation of data on a plurality of said output lines as a response.

8. A memory system comprising:

first, second, third, and fourth output signal lines;

first, second, third, and fourth submemories, having respective storage locations accessed by respective common data busses and addressed by respective column and row address lines;

means for generating READ column address coordinates having an integral portion with a least significant bit and with more significant bits, which more significant bits are applied to said second and fourth submemories as column addressing during their being read;

means for adding the least significant bit of the integral portion of each said READ column address coordinate and its more significant bits to develop a modified READ column address coordinate, applied to said first and third submemories as column addressing during their being read;

means for generating READ row address coordinates having an integral portion with a least significant bit and with more significant bits, which more significant bits are applied to said third and fourth submemories as row addressing during their being read;

means for adding the least significant bit of the integral portion of each said READ row address coordinate and its more significant bits to develop a modified READ row address coordinate, applied to said first and second submemories as row addressing during their being read; and an output multiplexor responding to the least significant bit of the integral portion of said column address coordinate and the least significant portion of said row address coordinate being both ZERO's to connect the first and second and third and fourth submemory data busses respectively to the first and second and third and fourth output signal lines, being respectively ZERO and ONE to connect the first and second and third and fourth data busses respectively to the third and fourth and first and second output signal lines, being respectively ONE and ZERO to connect the first and second and third and fourth data busses respectively to the second and first and fourth and third output signal lines, and being both ONE's to connect the first and second and third and fourth data busses respectively to the fourth and third and second and first output signal lines.

9. A memory system as set forth in claim 8 including:

means for generating WRITE column address coordinates having an integral portion with at least significant bit and with more significant bits, which more significant bits are applied to said second and fourth submemories as column addressing during their being written;

means for adding the least significant bit of the integral portion of each WRITE column address coordinate and its more significant bits to develop a modified WRITE column address coordinate, applied to said first and third submemories as column addressing during their being written;

means for generating WRITE row address coordinates having an integral portion with a least significant bit and with more significant bits, which more significant bits are applied to said third and fourth submemories as row addressing during their being written;

means for adding the least significant bit of the integral portion of each said WRITE row address coordinate and its more significant bits to develop a modified WRITE row address coordinate, applied to said first and second submemories as row addressing during their being written;

from one to four input signal lines ordinally numbered;

respective input selector means for each input signal line responsive to the least significant bits of the integral portions of said column and row address coordinate for connecting that input signal line to the data bus of the submemory to which the correspondingly numbered output signal line would be connected by said output multiplexor responsive to the same least significant bits of the integral portions of said column and row address coordinates.

10. A memory system as set forth in claim 8 or 9 wherein said means for generating READ column address coordinates is of a type generating said READ column address coordinates with greater resolution than expressed in said integral portion thereof, as expressed in a fractional portion thereof; wherein said means for generating READ row address coordinates is of a type for generating READ row address coordinates with greater resolution than in said integral portion thereof, as expressed in a fractional portion thereof; and wherein there is connected in combination therewith a two-dimesional linear interpolator comprising:

means for linearly interpolating between output signals on said first and second output signal lines in accordance with the fractional portion of said READ column address coordinate to obtain a first intermediate interpolation result;

means for linearly interpolating between output signals on said third and fourth output signal lines in accordance with the fractional portion of said READ column address coordinate to obtain a second intermediate interpolation result,; and means for linearly interpolating between said first and second intermediate interpolation results in accordance with the fractional protion of said READ row address coordinate to obtain a final interpolation result as the output of said two-dimensional linear interpolator.

* * * * *